E. FORD.
Improvement in Expansive-Bits.
No. 131,946.
Patented Oct. 8, 1872.
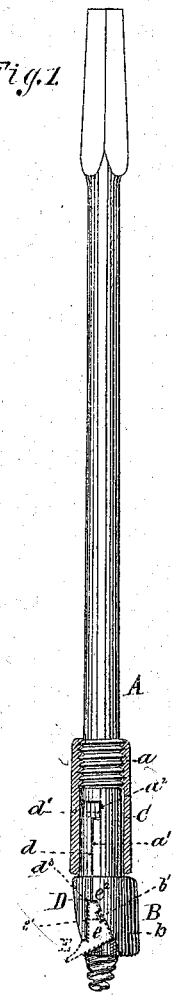
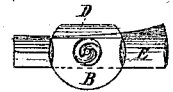
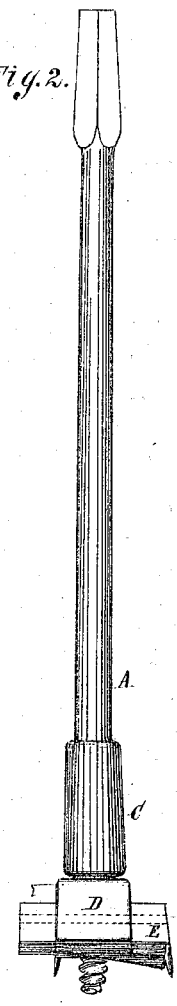
Witnesses:
G. Mattery
C. A. Pettit
Inventor:
Ellsworth Ford
per _____
Attorneys.

UNITED STATES PATENT OFFICE.

ELLSWORTH FORD, OF WESTVILLE, CONNECTICUT.

IMPROVEMENT IN EXPANSIVE BITS.

Specification forming part of Letters Patent No. 131,946, dated October 8, 1872.

*To all whom it may concern:*

Be it known that I, ELLSWORTH FORD, of Westville, in the county of New Haven and State of Connecticut, have invented an Expansive Boring-Bit, of which the following is a specification:

The invention relates to that class of wood-borers in which the same bit combines a cutter both for making the circumferential incision and for taking out a core. It will first be fully described in connection with all that is necessary to a full understanding thereof, and then clearly pointed out in the claim.

Figure 1 is a longitudinal section. Fig. 2 is a longitudinal elevation. Fig. 3 is an end view.

A represents the shank of a boring-bit; B, the cutter-head; C, a sleeve; D, a clamp; and E, an adjustable cutter. The shank A has thread $a$ just above the cutter-head B, while the sleeve C is correspondingly threaded on the inside, so as to enable it to be slid off and on said thread $a$. $a^1$ is a plane face, and $a^2$ is a notch at the upper end thereof, which receive the correspondingly-constructed face $d$ and projection $d^1$ of the shank of clamp D. The clamp D is itself of suitable width, and provided with a recess, $d$, extending from shoulder $d^3$ to the end. The cutter-head B has an angular transverse channel, $b$, and cross-rib $b^1$, which may be a dovetail, or of any preferred shape. The cutter E has an angular shank, $e$, which fits into channel $b$, and a groove, $e^1$, which receives the rib $b^1$ of clamp. The cutter E being thus fitted into the head B, the shoulder $d^3$ of the clamp is brought against the edge $e^2$ of the cutter, while the projection $d^1$, on the end of clamp D, is placed in the notch $a^2$ of shank A, when the sleeve C is screwed down. The boring-tool is now ready for work, and whenever a less or greater diameter is desired in the aperture to be bored, then the sleeve C is unscrewed and the tool adjusted accordingly.

Having thus described my invention, what I claim as new, and desire to secure by Letters Patent, is—

The shank A, head B, sleeve C, and clamp D, combined with the tool E, as and for the purpose described.

ELLSWORTH FORD.

Witnesses:
 SOLON C. KEMON,
 THOS. D. D. OURAND.